United States Patent Office 2,950,015
Patented Aug. 23, 1960

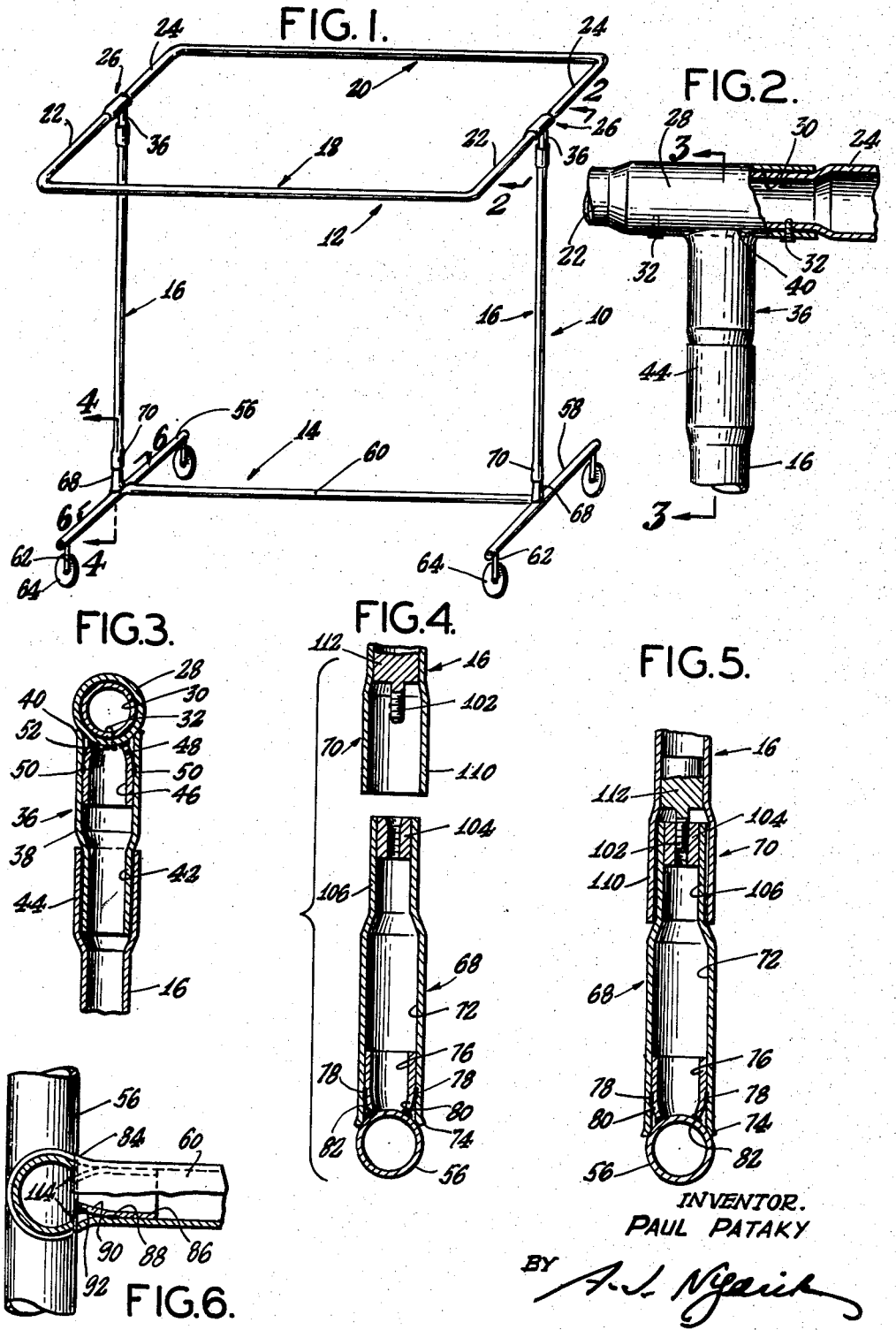

2,950,015

JOINTS FOR TUBULAR METALLIC CONSTRUCTIONS

Paul Pataky, 221—16 130th Ave., Laurelton, N.Y.

Filed Apr. 9, 1953, Ser. No. 347,697

9 Claims. (Cl. 211—182)

This invention relates to metallic tubular structures. In particular, it is directed to a novel arrangement for joining tubular metallic stock. Even more particularly, it is directed to racks and related structures made from tubular metallic stock having permanent joints of great rigidity which are marked by the absence of blemishes arising from the formation of the joints.

It has been customary heretofore to manufacture racks from tubular metallic stock by cutting the same into appropriate lengths to form the components of the structure and assembling those components by threaded arrangements or by means of nuts and bolts. Such modes of assemblage have been followed in order to provide racks and related structures which may be shipped in the "knocked down" (K.D.) condition. The customary method of assembling the knocked down components is to align and position the related or matching components together; and to effectuate the joinder thereof by means of nuts and bolts.

Such structures are designed for free movement as for example the familiar clothes racks, etc., employed in displaying and storing articles of wearing apparel or merely for the storage thereof. The bases or legs thereof are provided with casters or other appropriate elements that allow for ready sliding or movement of the structure on the floor. As a consequence of the repeated movements of the structures, their sturdiness diminishes as the nuts and bolts loosen. To overcome the loosening, it becomes necessary to use tightening tools, such as screwdrivers, wrenches or pliers. The use of such tools, especially in the hands of inexpert persons, results in the disfigurement of the structure, damage to the threads, etc.

The foregoing disadvantages of racks assembled as above described are particularly objectionable in the case of structures made of lustrous, plated stock, as, for example, chromium plated tubing. Such racks are made from lustrous plated stock so as to provide requisite utility coupled with attractive appearances. The disfigurement of the plating makes it difficult to preserve their fine appearances.

In considering how to overcome the disadvantageous characteristics of the racks constructed as above described, I have sought to achieve the requisite sturdiness by utilizing permanent joinder of the component tubular elements while providing, at the same time, the requisite advantages inherent in structures which may be delivered in a K.D. condition. The direct union, as by brazing or welding, of the segments of tubular stock, would not result in the formation of a smooth joint. To achieve a smooth joint, it would be necessary to grind, buff and polish prior to plating. If the joint was made from tubular stock that already had been plated, the plating at the point of the brazing or welding would be ruined.

I have discovered, however, that I could achieve a joinder of the tubular metallic components by employing spot welding techniques without incurring the high costs of manufacturing an attractive structure if the direct welding techniques described above were employed.

Accordingly, it is among the principal objects of this invention to provide a novel joinder of tubular metallic stock by spot welding which does not require subsequent manipulation of the welded joints in order to obtain smooth surfaces for the reception of the plating. A further object of this invention is to provide a novel form of welded joint, using tubular metallic stock, which is characterized by the absence of disfiguring welds. A still further object of this invention is to provide a novel form of welded joint using tubular plated metallic stock which does not suffer from spoilage of the plating.

In its fundamental aspects, the objects of this invention may be achieved by: (1) flaring the end of a first tubular metallic member so as to provide a seat for a second tubular cross-member placed thereon; (2) spot welding within the first member, a tubular metallic plug near the flared end thereof, the said plug being disposed so as to contact the cross-member; and (3) spot welding the cross-member to the plug.

A structure of such type is characterized by great rigidity of the joint, and absence of disfiguring welds or brazes at the line of juncture between the members. Such a joint may be made from metallic stock that is plated without danger of ruining the plating. Such a joint also can be plated, if made from unplated stock, without need to engage in brazing, buffing or smoothing operations before plating.

The technique is therefore adaptable to the fabrication of units which are welded either from plated tubular metallic stock or unplated stock.

The objects set forth above, as well as other objects and advantages, will become more apparent from the following detailed description of this invention taken in connection with the accompanying drawing, wherein:

Fig. 1 is a perspective view of a rack, in assembled form, made in accordance with the principles of this invention.

Fig. 2 is a fragmentary view of that portion of the rack illustrated in Fig. 2 as seen on the line 2—2 of Fig. 1.

Fig. 3 is a cross-sectional view of the portion of the structure illustrated in Fig. 2 as seen on the line 3—3 thereof.

Fig. 4 is a cross-sectional view, in disassembled relationship of that portion of the structure which is illustrated in Fig. 1 as seen on the line 4—4 thereof.

Fig. 5 is a view of the portion of the structure shown in Fig. 4 in assembled relationship.

Fig. 6 is a cross-sectional view of that portion of the structure which is illustrated in Fig. 1 as seen on the line 6—6 thereof.

Referring now more particularly to Fig. 1, the numeral 10 designates an erected rack assembled from several sections which are shipped from the factory in knocked down condition. The sections are respetcively the support 12 for garment hangers, the base 14 and uprights 16. Section 12 is formed from two U-shaped tubular metallic elements 18 and 20 having legs 22 and 24 respectively. A leg 22 and leg 24 are joined, by slip-fitting, as at 26, the details of the joint being shown in Fig. 2. As seen in Fig. 2, the end portion of leg 22 is expanded in diameter as at 28 while the end portion of leg 24 is correspondingly reduced as at 30, thereby providing for the snug slip-fitting of the latter into the former. This joint may be locked as by the screws 32, or any other convenient means.

Section 12 is provided with a pair of depending stems 36 adapted to engage the upper ends of the risers 16. As seen in Figs. 2 and 3, the stem 36 is a short piece of tubular metallic stock 38, the upper end of which is flared out as at 40, to provide a seat for the expanded extremity 28 of leg 22. The lower end portion of 38 is reduced in diameter, as at 42, so as to fit snugly, but removably when needed, into the upper end portion of upright 16 which is expanded in diameter, as at 44. A plug 46, made of a short piece of tubular metallic stock, the upper end of which is inturned as at 48, is inserted within 38 at a sufficient distance below the flared end 40 to provide a seat for the expanded end portion 28 of leg 22 at the same time that 28 rests on the flared end 40. The plug 46 is spot welded, as at the weld spots 50, so as to form a permanent inner component of the stem 36. The upper end 48 of the plug is spot welded to the expanded end 28 of leg 22, as at the spots 52, thereby effectuating a permanent joinder or union of the stem 36 to 28.

The base 14 comprises a pair of tubular metallic cross members 56 and 58, connected to each other by the stringer 60. The ends of the cross members 56 and 58 are each provided with appropriate fittings 62 to receive casters 64 or similar devices. Each of the cross members is provided with an upwardly disposed stem 68 which is adapted to engage the lower end 70 of a riser 16. As seen in detail in Figs. 4 and 5, the stem 68 is a short piece of tubular metallic stock 72, the lower end of which is flared out as at 74, to provide for the seating of the stem vertically on the cross member to which it is affixed. A plug 76, made of a piece of tubular metallic stock, akin to plug 46, is positioned in 72 and spot welded thereto, as at the weld spots 78, which are similar to weld spots 50, so as to form a correspondingly permanent inner component of the stem 68. The inturned end 80 of the plug 76 is spot welded, as at the spots 82, to the cross member.

As seen in Fig. 6, the stringer 60 is joined to the cross members 56 and 58 by shaping and spot welding technique described above. The ends of stringer 60 are flared out, as at 84 to provide for the seating thereof against cross members 56 and 58. Each of the ends of the stringer is provided with a plug 86 made of a piece of tubular metallic stock, akin to plugs 46 and 56. The plugs are positioned within and spot welded to stringer 60, as at the spots 88, to form permanent inner components thereof. The inturned end 90 of the plug 86 is spot welded, as at the spots 92, to the cross member.

To provide for the rigid affixation of the risers 16 to the stems 70, the lower end of each riser is provided with an internally disposed screw 102 adapted to be received by a nut 104 set within the reduced end portion of the stem 68. The nuts 104 are snug-fitted into 106. The lower end portions of the risers 16 are expanded in diameter as at 110. The screws 102 extend downwardly from a substantially sized head 112 which is snug-fitted into the lower part of 16 near the beginning of the expanded end 110 thereof.

To provide for the easy close fitting of the flared end 74 and 84 to the cross member, as for example 56, the overlapping portions of those flares may be removed, as by grinding or any other convenient means, so that the flares abut each other, as for example in the form shown at 114 in Fig. 6.

It will be understood of course that the flaring or shaping of the tubular stock to provide for the seating thereof against a tubular cross piece is but one means of effectuating said seating. As used in the specification and appended claims, therefore, the term "shaping" means any mode of suitable working, as by swaging, cutting, notching, etc., of the metal tubing which will provide a seat for the cross member that is affixed thereto.

It will be understood that the foregoing description of the invention as applied to the embodiment illustrated is merely illustrative of one mode of practicnig the same. The concept, of course, is applicable to a variety of structures or frameworks utilizing the novel form of joining or uniting the metallic tubular stock.

In its fundamental aspects therefore, the invention is directed to metallic tubular constructions or frameworks wherein one metallic tube is joined to, and intermediately the ends of, another tube at any angle, as in the form of a T or Y. The inventive concept resides in: (1) flaring or shaping an end of the first tube to provide a seat or saddle for the longitudinally disposed second tube, (2) securing a plug within the first tube (as by spot welding or other suitable means), the plug having an end shaped to contact the second tube when the latter is seated on the first tube, and (3) welding (as by spot welding) the plug to the seated second tube. The plug may be formed of a piece of metal tubing, an end thereof being inturned or peened to provide the appropriate or suitable contacting of the tube that is welded thereto.

Since, as has been stated above, the foregoing description of the invention and one mole of practicing the same is merely illustrative of the principles thereof, it will be understood that the appended claims are to be construed as defining the invention within the full spirit and scope thereof.

I claim:

1. In metallic tubular construction, a joint comprising, in combination, a first tubular member and a second tubular member one end of said first tubular member having a radially outwardly flared seat receiving an intermediate portion of said second tubular member, a plug received within said one end of said first tubular member having an outer end of reduced cross sectional area in engagement with said second tubular member, and a weld securing said outer end of said plug to said second tubular member.

2. In a demountable article supporting rack having a horizontal article supporting section of tubular metallic stock, a horizontal base section of tubular metallic stock, a riser of tubular metallic stock extending vertically between said article supporting section and said base, and a joint assembly connecting each end of said riser to the respective one of said sections, each said joint assembly comprising in combination a tubular member having a radially outwardly extending flare defining a seat at one end for abutting engagement with said respective section, a plug integrally secured within one end of said tubular member and having a radially inwardly tapered end adjacent said flare of said tubular member for securing engagement with said respective section, a first weld securing said tapered end of said plug to said section, and a second weld securing an intermediate portion of said plug to the interior of said tubular member, said flared end of said tubular member being radially spaced outwardly from and masking said first weld.

3. In a demountable article supporting rack having a horizontal article supporting section of tubular metallic stock and a horizontal base section of tubular metallic stock with a riser of tubular metallic stock extending vertically therebetween, an improved joint assembly for connecting each end of said riser to the respective one of said sections comprising, in combination, a tubular member having a radially outwardly extending flare defining a seat at one end for abutting engagement with said metallic section, a plug integrally secured within said one end of said tubular member and having a radially inwardly tapered end adjacent to said flare of said tubular member for securing engagement with the tubular section, a first weld securing said tapered end of said plug to the section, and a second weld securing an intermediate portion of said plug to the interior of said tubular member, said flared end of said tubular member being spaced radially outwardly from said tapered end of said plug masking said first weld.

4. A joint comprising, in combination, a first tube and an intersecting second tube, said first tube having a radially outwardly flared and longitudinally inwardly recessed end defining a saddle type seat receiving a side of said second tube therein, a plug having a radially inwardly reduced outer end secured to said side of said second tube, and the opposite end of said plug being slidably received axially within said flared end of said first tube.

5. A joint as set forth in claim 4, further comprising means securing said first tube to said plug.

6. A joint comprising, in combination, a first tube, a second tube having a radially outwardly flared and longitudinally inwardly recessed end defining a seat receiving a side of said first tube at a predetermined angle therewithin, a cylindrical plug secured at one end to said side of said first tube with the longitudinal axis of said plug intersecting the longitudinal axis of said first tube at said predetermined angle, and said recessed end of said second tube slidably receiving the opposite end of said plug therewithin.

7. A joint as set forth in claim 6, further comprising means securing said second tube to said plug.

8. A joint as set forth in claim 6, wherein said opposite end of said plug is of reduced diameter.

9. A joint as set forth in claim 6, wherein said predetermined angle is a right angle, and the longitudinal axis of said first tube extends in a direction normal to the longitudinal axes of said second tube and said plug.

References Cited in the file of this patent

UNITED STATES PATENTS

| | | |
|---|---|---|
| 562,067 | Copeland | June 16, 1896 |
| 850,658 | Koonce | Apr. 16, 1907 |
| 1,411,340 | Gail | Apr. 4, 1922 |
| 1,941,465 | Cornell | Jan. 2, 1934 |
| 2,183,563 | Hart | Dec. 19, 1939 |
| 2,286,210 | Klemperer | June 16, 1942 |
| 2,440,631 | Eakin et al. | Apr. 27, 1948 |
| 2,455,057 | Hart | Nov. 30, 1948 |
| 2,533,324 | Mendle | Dec. 12, 1950 |
| 2,573,275 | Richey | Oct. 30, 1951 |
| 2,647,000 | Colley | July 28, 1953 |

FOREIGN PATENTS

| | | |
|---|---|---|
| 462,370 | Germany | July 10, 1928 |